Feb. 21, 1967 T. C. TYNDALE 3,304,637
AUDIO-VISUAL DEVICE

Filed Oct. 28, 1964 3 Sheets-Sheet 1

INVENTOR.
THOMAS CONLEY TYNDALE
BY Darby & Darby
ATTORNEYS

Feb. 21, 1967 T. C. TYNDALE 3,304,637
AUDIO-VISUAL DEVICE
Filed Oct. 28, 1964 3 Sheets-Sheet 2

INVENTOR.
THOMAS CONLEY TYNDALE
BY Darby & Darby
ATTORNEYS

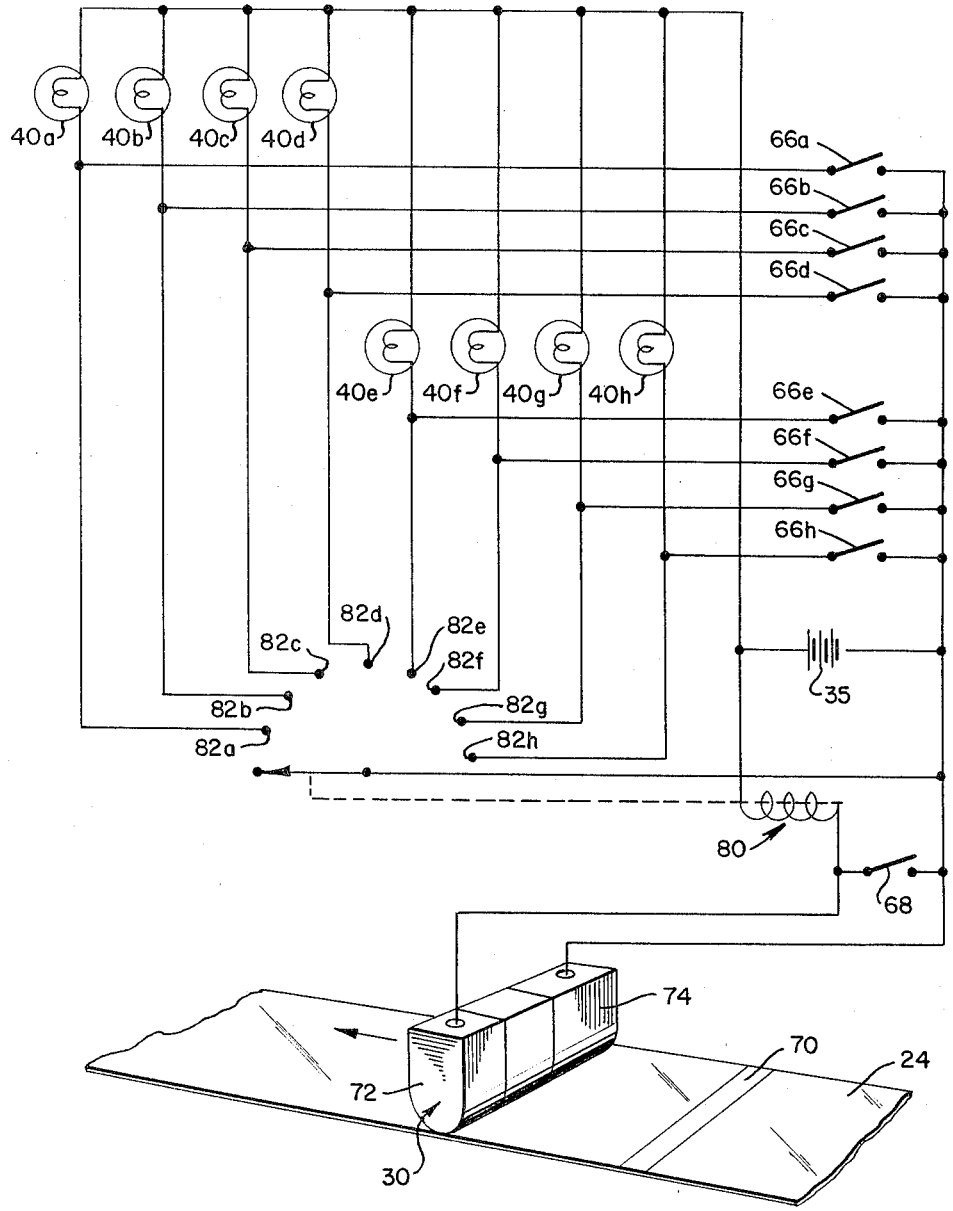

United States Patent Office 3,304,637
Patented Feb. 21, 1967

3,304,637
AUDIO-VISUAL DEVICE
Thomas Conley Tyndale, 55 Austin Place,
Staten Island, N.Y. 10304
Filed Oct. 28, 1964, Ser. No. 407,181
3 Claims. (Cl. 40—28.1)

This invention relates to audio-visual devices, and, in particular, to a portable audio-visual device which can be powered solely by self-contained batteries.

An audio-visual device, as its name implies, provides a visual acompaniment to a prerecorded audio program. Such devices are commonly used for teaching and promotional or selling purposes to enable the visual display of a subject which is being discussed by the playback of a prerecorded audio program. Particularly as a selling aid audio-visual devices have gained increasing popularity, and since the user normally desires to carry the device from place to place, the prior art has sought to produce a cordless, portable audio-visual device. However, for reasons explained below, these objectives have not yet been achieved.

All known audio-visual devices, which would have utility as a selling aid, employ some form of light projection to provide the visual display portion of the program. The projection of light requires a greater source of power than available "portable-type" batteries are capable of providing. As a result, it is impossible, within the limits of practicality, to make a battery powered, portable audio-visual device. In all "portable" audio-visual devices as presently known, it is necessary that the device itself be plugged into a conventional socket to provide the power needed.

Because of the power requirements of a light projecting system, it is not possible to substitute conventional batteries for the 110 volt A.C. source of conventional wall sockets. This is a particular disadvantage when using an audio-visual device as a selling aid, since it limits the utility of the device to locations in which a socket exists, and also because of the additional time required to set up the display. Such time, though nominally small, has been found to be a considerable disadvantage of the prior art devices when used for selling purposes. Various other inconveniences which attend the use of plug-in devices, for various reasons are significant disadvantages to a salesman who is trying to sell his product to another person.

Accordingly, the main object of this invention is to provide an audio-visual device which is of particular utility as an improved selling aid.

A more specific object of the invention is to provide a light-weight, cordless, audio-visual demonstrator which can be powered solely by self-contained batteries.

Another object of the invention is to provide a self-contained audio-visual device which can be housed in a small attache case or the like.

Briefly, in accordance with the invention, the above and other objects of the invention are accomplished by a visual system which does not require the projection of light, and, instead, relies on battery operated lamp means to illuminate a picture such as a photographic transparency. The audio portion is recorded on a medium such as magnetic tape which includes control information for energizing the lamp means to illuminate a given picture as the corresponding audio portion is replayed. The audio unit may be a commercially available battery powered tape recorder, whereby the device can be powered solely by self-contained batteries.

The manner in which the above and other objects of the invention are accomplished will be more fully described below with reference to the attached drawings wherein:

FIGURE 7 is a circuit diagram of the control circuits and lamps according to the invention.

Figure 1:
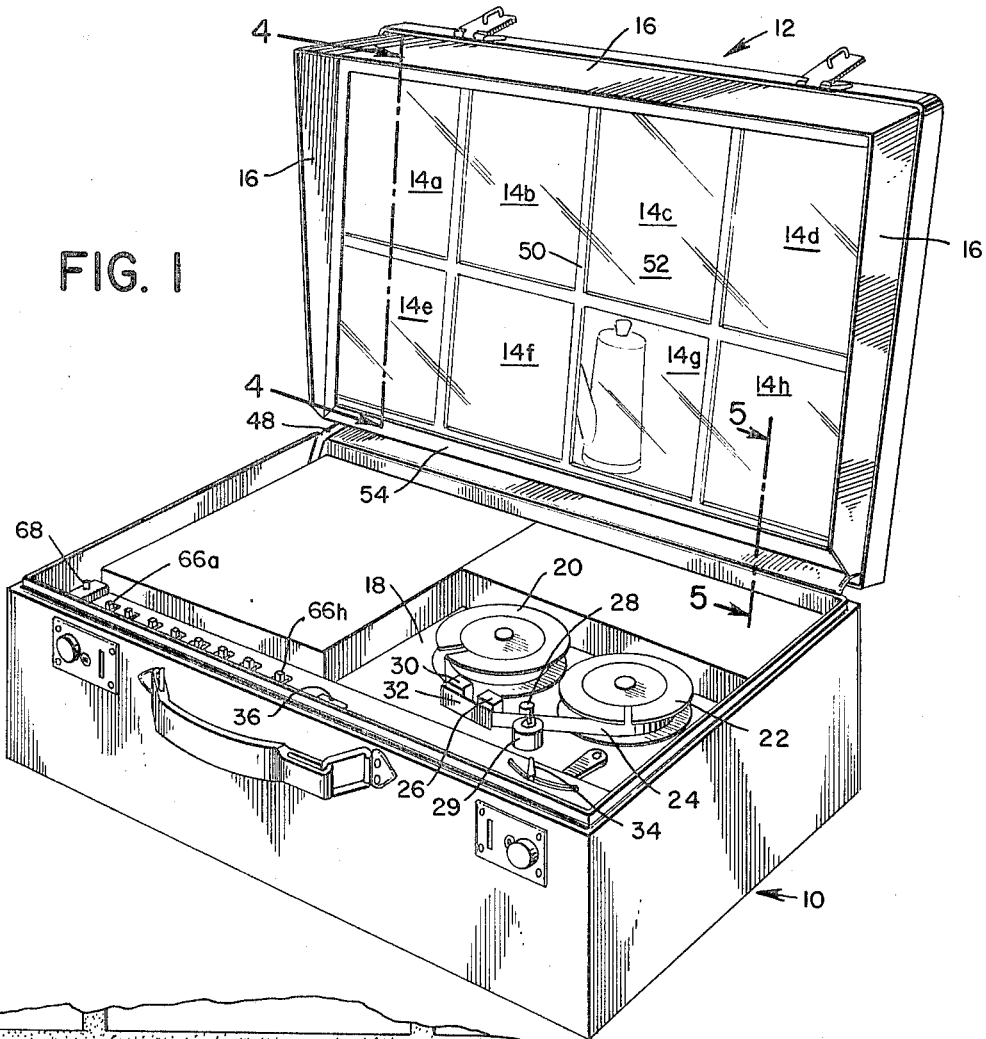
FIGURE 1 is a perspective view of an open attache case in which the audio-visual device of the invention has been mounted.

In FIGURE 1, for purposes of simplicity and explanation, the invention is shown as incorporating a commercially available two reel magnetic tape; however, the invention is not so limited and various other recording media will be obvious to those skilled in the art. For example, a conventional endless tape would have particular utility with the present invention.

As illustrated, the audio-visual device is housed in an attache case comprising a base portion 10 and a hinged cover 12. Within the cover is mounted the visual portion of the display, which comprises eight pictures 14a to 14h mounted in two rows of four. In the following description, the use of the letters a to h adjacent a call-out numeral, indicates that the component referred to corresponds to a given picture, and that the remaining pictures include an identical counterpart. A rectangular strip shield 16 is placed around the periphery of the pictures 14a to 14h within cover 12 to protect the pictures and to shield the display from exterior light. Each of the pictures 14a to 14h is a visual display corresponding to a recorded audio portion which is to be replayed by a magnetic tape recorder 18 housed in the base portion 10 of the attache case.

Tape recorder 18 includes supply and takeup reels 20 and 22, respectively, around which the magnetic tape 24 is wound. The tape 24 is driven past a playback head 26 by a drive shaft 28 cooperating with a capstan 29 in the usual manner. A special control head 30 adjacent playback head 26 receives control information which is contained on tape 24 to control the illumination of one of the appropriate pictures 14a to 14h. In the illustrated embodiment, and as explained in detail below, the control head 30 comprises a modified form of the normally present recording head. A soft pad, illustrated schematically at 32, pushes tape 24 against heads 26 and 30 by means (not shown) when the playback operation is initiated by movement of a start lever 34 to the right; movement of lever 34 to the left will rewind the tape.

Figure 3:
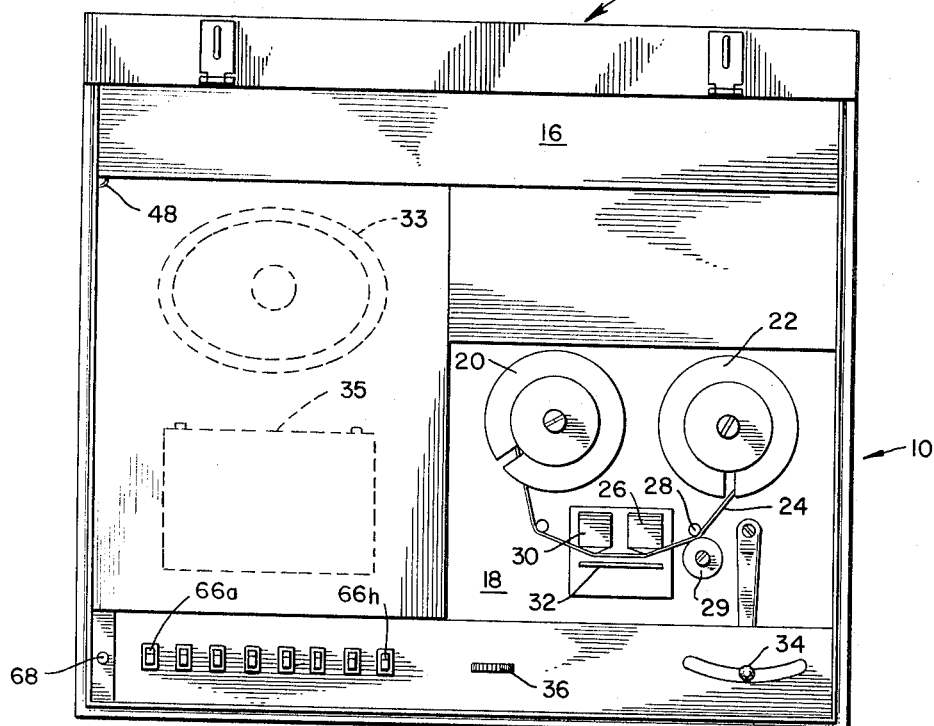
FIGURE 3 is a top view of the invention illustrated in FIGURE 1.

The loud speaker which reproduces the audio portion of the information recorded on tape 24 is illustrated schematically at 33 in FIGURE 3. Conventional transistor amplifiers (not shown) may be housed beneath the recorder 18. The recorder is powered by batteries 35, schematically shown in FIG. 3. A dial 36 controls the volume of loud speaker 33 in the usual manner.

Figure 2:
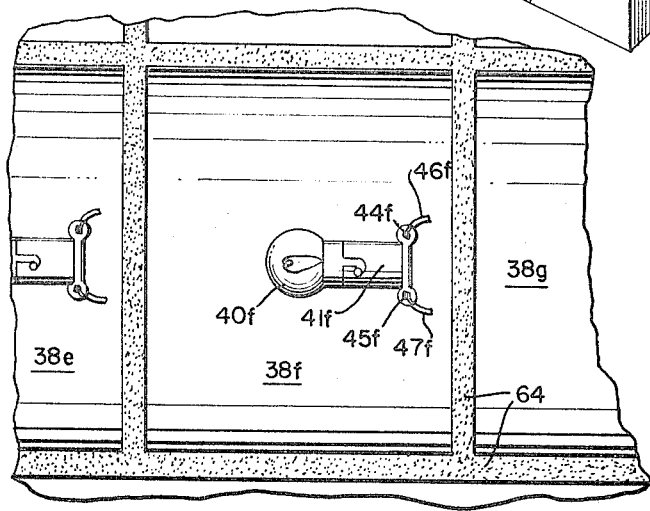
FIGURE 2 illustrates the manner in which the lamps are mounted.
Figure 4:
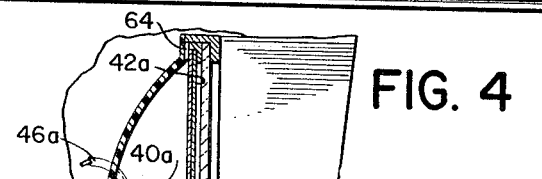
FIGURE 4 is a sectional view along the lines 4—4 of FIGURE 1.

As shown in FIGURES 2 and 4, a vacuum formed plastic reflector 38 is situated behind the pictures 14a to 14h. The reflector 38 includes eight cylindrical portions 38a to 38h (of which only 38a and 38e are illustrated in FIGURE 4) which correspond to the respective pictures 14a to 14h. In each of cylindrical sections 38a to 38h, a small lamp 40a to 40h is mounted in respective bayonet type sockets 41a to 41h, which may be secured to the corresponding reflector portions 38a to 38h in any desired manner. Each socket 41a to 41h includes two terminals 44 and 45 from which respective wires 46 and 47 are fed through suitable apertures within the reflector 38 and combined into a single cable 48 (see FIG. 1) for connection to the control circuitry within base portion 10 of the attache case.

Various different types of pictures 14a to 14h may be employed. In a preferred embodiment, the pictures comprise photographic color transparencies (such as the type used with slides), two of which are illustrated in FIGURE 4 at 42a and 42e. In this particular embodiment, it is also desirable to insert white translucent backing sheets 49a to 49h between the photographs 42a to 42h and lamps 40a to 40h to provide an even dispersion of the light from the lamps.

Figure 6:
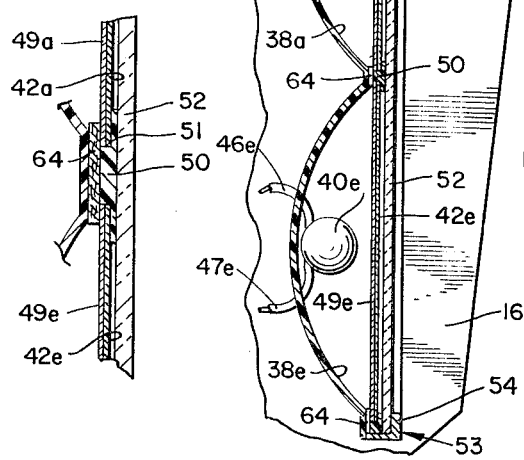
FIGURE 6 is a sectional view showing the manner in which the pictures are held in place.

A visual frame 50 of the shape illustrated in FIG. 1, and made of plastic, is placed in front of the photographs and backing sheets to visually separate the pictures. As shown in FIGURE 6, the back of frame 50 may include suitable mounting strips 51 to properly separate and support the photographs 42a to 42h. A single glass sheet 52 of sufficient size to cover all of the pictures 14a to 14h is placed on top of the frame 50 to protect the photographs 42.

Photographs 42a to 42h, backing sheets 49a to 49h, frame 50, and glass sheet 52 are all retained within a rectangular mounting frame 53, which includes an exterior flange 54 extending around the entire periphery of glass sheet 52.

Figure 5:
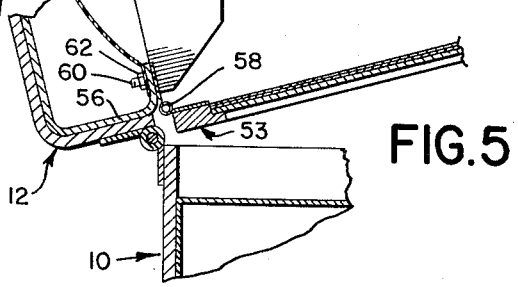
FIGURE 5 is a sectional view along the line 5—5 of FIGURE 1.

As shown in FIGURE 5, a support sheet 56 is secured to the interior portion of attache cover 12. Mounting frame 53 is pivotally secured to sheet 56 by two hinges 58. Conventional fastener means such as screw 60 and nut 62 serve to secure the hinges 58 and reflector 38 to mounting sheet 56, and thus hold them within the cover 12. Hinges 58 enable the user to swing open mounting frame 52 with respect to the cover 12 in order to change the various pictures should it be desired to alter the visual program. Conventional means such as screws (not shown) may be used to secure mounting frame 50 in its closed position.

Strips of felt 64 or the like may be inserted between the front of reflector 38 and the backing sheets 49a to 49h to limit the incidence of stray light from the respective lamps and to secure the visual structure together. When the supporting frame 50 is closed as illustrated in FIGURE 4, the light from the energized one of lamps 40a to 40h is effectively limited to the back of its associated picture 14a to 14h. The light is dispersed by the concave shape of the individual reflector portions 38a to 38h and the backing sheets 49a to 49h, so that, to the viewer, the pictures appear evenly illuminated.

The control panel may further include a plurality of switches 66a to 66h, corresponding to the similarly numbered pictures 14a to 14h, which enable the operator to illuminate any desired picture at any desired time. A reset button 68 may be used to manually step the control mechanism as explained below.

When the salesman or other user desires to present his display, the case is opened as illustrated in FIG. 1, and lever 34 is thrown to the start position. As the tape begins to unwind, the audio portion of the demonstration is picked up by playback head 26 and fed through the conventional amplifiers (not shown) to loud speaker 33. When the special control signals on tape 24 appear, they are detected by the control head 30 and these signals are used by additional control circuitry within the base portion to sequentially energize the lamps 40a to 40h behind the pictures 14a to 14h, which thus illustrate the audio portion which is being replayed through loud speaker 33. As diagrammatically illustrated in FIGURE 1, lamp 40g has been energized, illuminating picture 14g which illustrates the subject which is being replayed. The remaining pictures, which are not illuminated, appear dark, and their subject matter does not become visible until the corresponding lamps are energized.

FIGURE 7 illustrates a schematic diagram of the electrical circuit in accordance with the invention.

In the preferred embodiment, the control information comprises a conductive strip 70 placed transversely on tape 24 at each location on the tape at which it is desired to switch the visual display. The control head 30 consists of the normally available recording head covered with two separated conductive terminal strips 72 and 74, for example, made of a conductive metal foil. A stepping switch 76 includes an armature 78 and an energizing coil 80. When coil 80 is energized, armature 78 is stepped around successive stationary contacts 82a to 82h corresponding to the lamps 40a to 40h, respectively. The power supply comprises the battery 35, which is, for example, a conventional nickel cadmium rechargeable battery. As shown, coil 80 is connected in series with the terminals 72 and 74 across the power supply 84.

When the conductive control marker 70 on tape 24 comes into contact with the control head 30, the conductive strip 70 closes the circuit between terminals 72 and 74. This in turn applies the voltage of battery 84 across coil 80 causing the armature 78 of the stepping switch 76 to step to terminal 82a. Since the tape is continually moving, the circuit is interrupted shortly after it is made and armature 78 remains at terminal 82a.

Each of the lamps 40a to 40h are coupled to one end of battery 84, the other ends of the lamps being connected to a respective switch terminal 82a to 82h. Since armature 78 is electrically connected to the other side of the battery 84, the armature closes a circuit across one of the lamps depending upon which of the stationary contacts 82a to 82h it is touching. When armature 78 contacts terminal 82a, a circuit is closed to lamp 40a, causing this lamp to illuminate the picture 14a. In a similar manner, the next occurring conductive strip on tape 24 energizes coil 80, stepping armature 78 to terminal 82b, which simultaneously de-energizes lamp 48 and energizes lamp 40b to illuminate picture 14b. As the program continues, the pictures are successively illuminated until the program is completed.

The slide switches 66a to 66h connect each of the respective lamps 40a to 40h across the power supply 84 to enable the selective illumination of any desired picture(s). Reset switch 68 is connected across terminals 72 and 74, and may be a conventional spring return, snap action switch whereby actuation thereof successively energizes coil 80 to manually step armature 78 through terminals 82a to 82h.

Although a preferred embodiment of the invention has been illustrated and described the invention is not so limited and many variations thereof will be obvious to those skilled in the art. For example, instead of using a conductive control strip 70 in conjunction with the special control head 30, the control information may comprise sub-audible signals recorded on the tape, which, when detected by transducer 26 and amplified in a suitable manner, causes the illumination of a desired picture. The stepping switch 76 may be a commercially available item and could be replaced by numerous other equivalent devices, including all-electronic means for successively actuating the various lamps. If desired, battery 35 may be of the rechargeable type, and the attache case 10 may include a wired-in battery charger, which, when plugged into a standard 110 volt outlet, will recharge the battery. The circuit may be designed to illuminate the various pictures in any desired sequence, or more than one at a time. In fact, the invention contemplates the use of a single lamp and a control mechanism responsive to the control information on the tape to selectively move a plurality of pictures, one at a time, in front of the lamp whereby the pictures are illuminated without the projection of light. Accordingly, the invention should not be limited except as defined in the following claims.

What is claimed is:
1. A cordless audio-visual demonstration aid comprising, a house having a cover, a frame for supporting a plurality of pictures mounted on the interior of said cover, a plurality of pictorial transparencies mounted in said frame for viewing when the cover is open, a corresponding plurality of electric lamps mounted in said cover, each of said lamps being mounted behind a respective one of said transparencies for illumination thereof, said cover further containing light dispersing means mounted on said frame between each of said lamps and its associated transparency, a battery powered magnetic tape mounted in said housing, said playback unit comprising a loud speaker and a movable magnetic tape containing audio and control information, battery means in said housing, and switching means connected in circuit with said battery and said plurality of lamps, said switching means being responsive to said control information for connecting said battery means to selected lamps in a desired sequence to illuminate said transparencies and thereby provide a preselected visual accompaniment to said audio information.

2. An audio-visual demonstration aid according to claim 1, including a reflector mounted between said cover and frame, said reflector including a concave portion for each of said lamps to direct the light from a given lamp onto its associated transparency.

3. An audio visual demonstration aid according to claim 2, including additional switch means mounted in said housing for manual and selective energization of any of said lamps.

References Cited by the Examiner

UNITED STATES PATENTS

| | | | |
|---|---|---|---|
| 1,719,518 | 7/1929 | Nissen | 40—132 |
| 2,092,761 | 9/1937 | Klein | 40—28.1 |
| 2,336,548 | 12/1943 | Kimball | 40—132 |
| 3,048,083 | 8/1962 | Rosenbaum | 40—28.1 X |
| 3,220,126 | 11/1965 | Gabrielson | 40—28.3 |

FOREIGN PATENTS 546,174    7/1942    Great Britain.

EUGENE R. CAPOZIO, *Primary Examiner.*

W. J. CONTRERAS, *Assistant Examiner.*